US007368644B2

(12) United States Patent
Shirayanagi et al.

(10) Patent No.: US 7,368,644 B2
(45) **Date of Patent: *May 6, 2008**

(54) TOP BOARD STRUCTURE FOR KEYBOARD INSTRUMENT

(75) Inventors: Eiichi Shirayanagi, Hamamatsu (JP); Fumiyoshi Furuki, Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 730 days.

This patent is subject to a terminal disclaimer.

(21) Appl. No.: 10/430,413

(22) Filed: May 7, 2003

(65) Prior Publication Data

US 2003/0209127 A1 Nov. 13, 2003

(30) Foreign Application Priority Data

May 10, 2002 (JP) ............................ 2002-135508

(51) Int. Cl.
*G01C 15/02* (2006.01)

(52) U.S. Cl. ...................................... 84/177; 84/423 R

(58) Field of Classification Search ....... 84/177–186.1, 84/173

See application file for complete search history.

(56) References Cited

U.S. PATENT DOCUMENTS

| | | | | |
|---|---|---|---|---|
| 1,498,955 A | | 6/1924 | Dinsmore | |
| 1,682,767 A | | 9/1928 | Opelt | |
| 1,690,549 A | | 11/1928 | Paley | |
| 1,794,816 A | | 3/1931 | Zeltner | |
| 1,960,126 A | | 5/1934 | Sharp | |
| 2,178,214 A | * | 10/1939 | Worthington | 84/177 |
| 5,175,386 A | * | 12/1992 | Kuwahara | 84/179 |
| 6,288,313 B1 | * | 9/2001 | Sato et al. | 84/177 |
| 6,992,242 B2 | * | 1/2006 | Shirayanagi et al. | 84/177 |
| 2001/0047714 A1 | | 12/2001 | Arimori | |
| 2002/0035911 A1 | | 3/2002 | Miura | |

FOREIGN PATENT DOCUMENTS

| | | |
|---|---|---|
| DE | 364 644 | 11/1922 |
| EP | 1361564 | 11/2003 |
| GB | 480966 | 3/1938 |
| JP | 05-313656 | 11/1993 |
| JP | 08-101687 | 4/1996 |
| JP | 2001-083960 | 3/2001 |

OTHER PUBLICATIONS

European Search Report dated Dec. 22, 2003.

* cited by examiner

*Primary Examiner*—Kimberly Lockett
(74) *Attorney, Agent, or Firm*—Dickstein Shapiro LLP

(57) ABSTRACT

A top board structure is adapted to a keyboard instrument (e.g., a grand piano) having a pair of a top board rear and a top board front, which are arranged close to each other with a gap therebetween above the upper portion of a case. Herein, the gap is enlarged using sliders along which the top board front can be moved forwards and backwards as necessary, wherein the top board rear is allowed to be opened only when the top board front is positioned to enlarge the gap. Therefore, the user can easily hold the free end of the top board rear to be opened or closed with fingers. Thus, it is possible to prevent the player from being anxious that finger tips will be caught in the gap during an opening motion and/or a closing motion of the top board rear.

14 Claims, 14 Drawing Sheets

TOP BOARD STRUCTURE FOR KEYBOARD INSTRUMENT

BACKGROUND OF THE INVENTION

1. Field of the Invention

This invention relates to top board structures for keyboard instruments such as grand pianos that are covered with top boards (or lids), wherein a player's fingers will not be caught in top boards when closed.

2. Description of the Related Art

Conventionally, grand pianos having top boards for covering cases are widely used, wherein grand pianos of a folded type are designed such that top boards are each divided into two pieces called top board rears, which are pivotally supported at one ends of cases of grand pianos and can be freely closed and opened, and top board fronts that are arranged in front sides of top board rears and are interconnected using hinges. When top boards are opened, a top board front is folded with hinges to be partially mounted onto a top board rear; then, the free end of the top board rear is lifted up together with the top board front.

Other types of grand pianos are designed not to use hinges for establishing interconnections between top boards and cases so that top board rears are not mutually interconnected with top board fronts, wherein they are independently closed and opened. That is, in a top board structure of an independent type, a top board rear is solely closed or opened while a top board front is closed. Therefore, compared with the top board structure of the folded type, it is possible to reduce weight of the top board rear in operation by the weight of the top board front; that is, it is possible to reduce loads in closing and opening top boards.

An example of a top board structure for a keyboard instrument is disclosed in Japanese Unexamined Patent Publication No. 2001-83960.

In the top board structure of the independent type in which each of the top board rear and top board front can be independently closed and opened, it is possible to prevent dust from entering into the inside of a case of a grand piano when the top board rear and/or top board front is closed. That is, the top board structure of the independent type can be designed to extremely reduce a gap between the top board rear and top board front. In other words, a player (or a user) may be anxious that tips of fingers will be unexpectedly caught in the gap between the top board rear and top board front when the player holds the front end of the top board rear in proximity to the top board front with the fingers. In order to prevent finger tips from being caught in the gap between the top board rear and top board front, the player (or user) should again take hold of the free end of the top board rear by slightly changing positions of fingers. Therefore, the player (or user) may experience difficulties in performing open/close operations of the top board rear, which are very troublesome.

SUMMARY OF THE INVENTION

It is an object of the invention to provide a top board structure for a grand piano in which a player (or a user) is not unnecessarily anxious that the fingers will be unexpectedly caught in a gap between a top board front and a top board rear when opened and closed, wherein open/close operations can be performed smoothly.

A top board structure of this invention is adapted to a grand piano that has a pair of top boards (namely, a top board rear and a top board front), which are arranged close to each other with a gap therebetween above the upper portion of a case including actions, strings, and the like. Herein, the gap between the top board rear and top board front is enlarged using sliders along which the top board front can be moved forwards and backwards as necessary, wherein the top board rear is allowed to be opened only when the top board front is positioned to enlarge the gap. Therefore, the player (or user) can easily hold the free end of the top board rear to be opened or closed with fingers. Thus, it is possible to prevent the player from being anxious that finger tips will be caught in the gap between the top board rear and top board front during an opening motion and/or a closing motion of the top board rear.

In the above, an opening motion regulator is arranged to reliably prevent the top board rear from being opened under conditions where the top board front is not moved forwards so that the gap is not enlarged. In addition, the top board rear once opened is securely supported by a support rod, which can be maintained at a stand position while being engaged with a shaft of the opening motion regulator.

Furthermore, the gap can be controlled by realizing partial deformation or displacement with respect to the top board front. For example, the gap can be enlarged by using a buffer member that is attached to the rear end of the top board front and can be elastically deformed upon insertion of fingers into the gap. Alternatively, the rear end portion of the top board front is designed to be deformed upon insertion of fingers, thus enlarging the gap.

BRIEF DESCRIPTION OF THE DRAWINGS

These and other objects, aspects, and embodiments of the present invention will be described in more detail with reference to the following drawings, in which.

DESCRIPTION OF THE PREFERRED EMBODIMENTS

Figure 1:
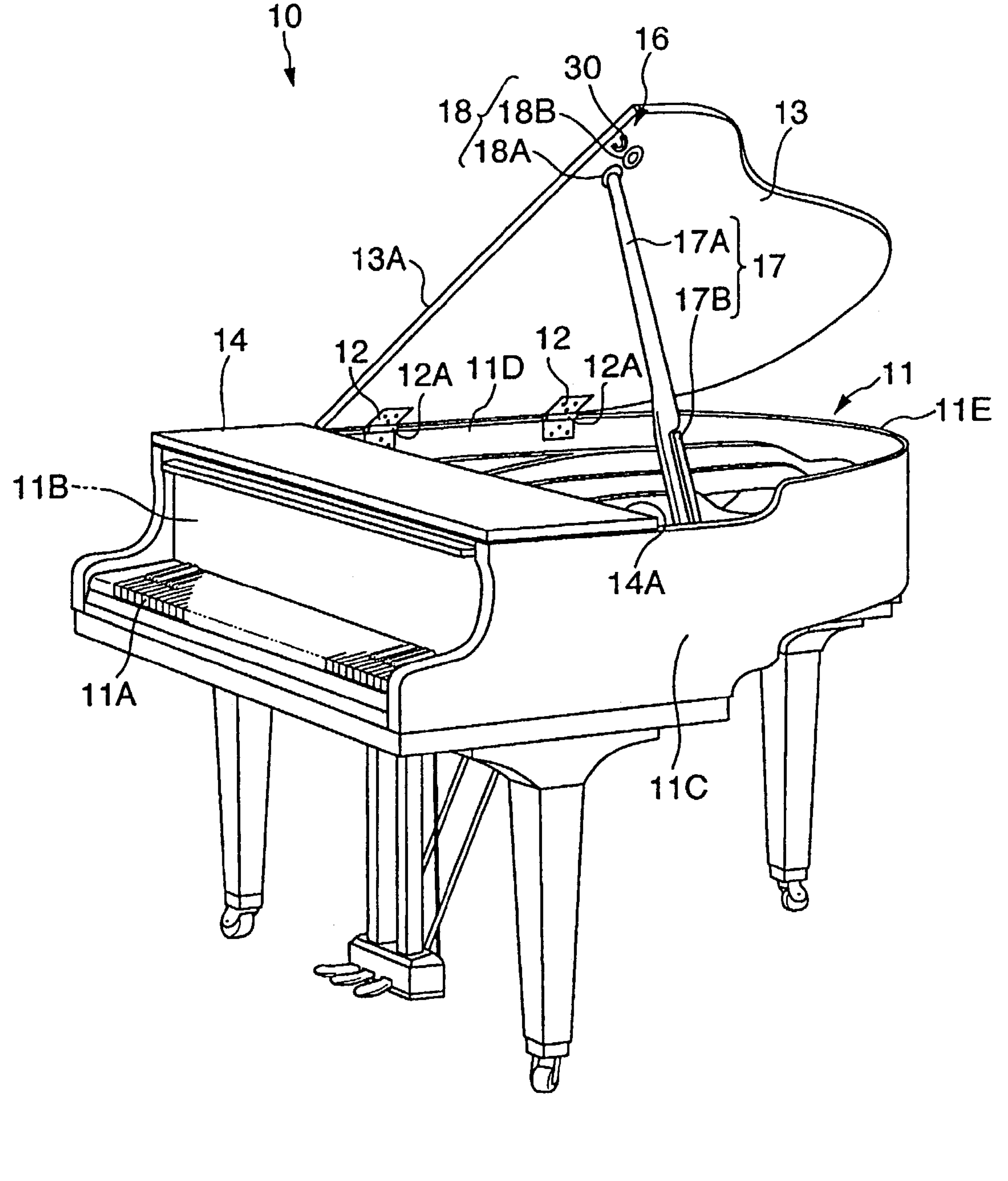
FIG. 1 is a perspective view showing an exterior appearance of a grand piano whose top board is opened.

This invention will be described in further detail by way of examples with reference to the accompanying drawings.

This invention is basically adapted to a grand piano that is equipped with a first top board (e.g., a top board rear), which is pivotally supplied at one end of a case of a grand piano and can be freely closed and opened, and a second top board (e.g., a top board front) whose terminal end directly faces a terminal end of the first top board when closed and which are arranged in proximity to or interconnected with the first top board.

In the above, the second top board can be moved (or slid) in a direction to increase a gap between the terminal end thereof and the terminal end of the first top board, wherein when the second top board is located at a prescribed position at which the gap is enlarged, a player (or a user) can start opening the first top board or end closing the first top board. In other words, when the second top board is not moved to enlarge the gap, the first top board is regulated in open/close operations. The aforementioned top board structure allows the player (or user) to start opening the first top board or to end closing the first top board only when the gap is enlarged. Therefore, it is possible to reliably prevent player's finger tips from being unexpectedly caught in the gap between the first and second top boards. Normally, the second top board is maintained at an initial position at which the gap is minimized; therefore, it is possible to remarkably reduce dust entering into the case of the grand piano.

The aforementioned grand piano can be additionally equipped with a support rod that holds the first top board to be adequately opened at a prescribed position above the case. Herein, when the second top board is restored to an initial position minimizing the gap, the first top board that is opened above the case can be held at a prescribed position using the support rod. Therefore, it is possible to maintain an opened condition of the first top board in a stable manner.

In addition, it is possible to modify the top board structure for a grand piano in such a way that the player can start opening the first top board when the second top board is moved to enlarge the gap, whereas the gap can be enlarged as the first top board is closed. Hence, even when the first top board is closed with a relatively small gap with the second top board, the gap can be automatically enlarged to prevent finger tips from being caught in the gap.

Furthermore, it is possible to arrange buffer members between terminal ends of first and second top boards, wherein buffer members can be deformed to enlarge the gap therebetween. Herein, by contracting buffer members, the player can easily insert fingers into the gap between the first and second top board without problem.

Moreover, the first and second top boards can be designed to have regions that can be deformed to enlarge the gap therebetween.

Incidentally, this invention is not necessarily adapted to grand pianos and can be adapted to other types of pianos such as electronic pianos having paired top boards covering cases.

1. First Embodiment

FIG. 1 is a perspective view showing the overall structure of a grand piano in accordance with a first embodiment of the invention. That is, a grand piano 10 shown in FIG. 1 is designed in a prescribed shape in which the upper portion can be freely opened and closed. Specifically, the grand piano 10 is constituted by a case 11 having actions and the like therein, a pair of hinges 12 including rotation shafts 12A that are arranged at two positions along one end of the upper portion of the case 11, a first top board (namely, a top board rear) 13, which is pivotally supported at one end of the upper portion of the case 11 by the hinges 12 and whose free end can be freely closed and opened above the case 11, a second top board (namely, a top board front) 14 that is arranged in front of and in proximity to the top board rear 13, a support rod 17 whose one end is rotatably supported at the other end of the case 11 (opposite to one end of the case 11 arranging the hinges 12) whose the other end supports the free end portion of the top board rear 13 to be opened at a prescribed position, and a receiving pan 18 for receiving the tip end of the support rod 17, which is arranged at a prescribed position of the free end portion of the top board rear 13.

The case 11 has a keyboard 11A, a fall board 11B that can be pivotally moved to cover the keyboard 11A, a right-side board 11C elongated backwards in a right side of the case 11, a left-side board 11D elongated backwards in a left side of the case 11, and a rear board 11E that is curved outwardly to expand backwards and that are interconnected with terminal ends of the right-side board 11C and left-side board 11D.

Figure 2:
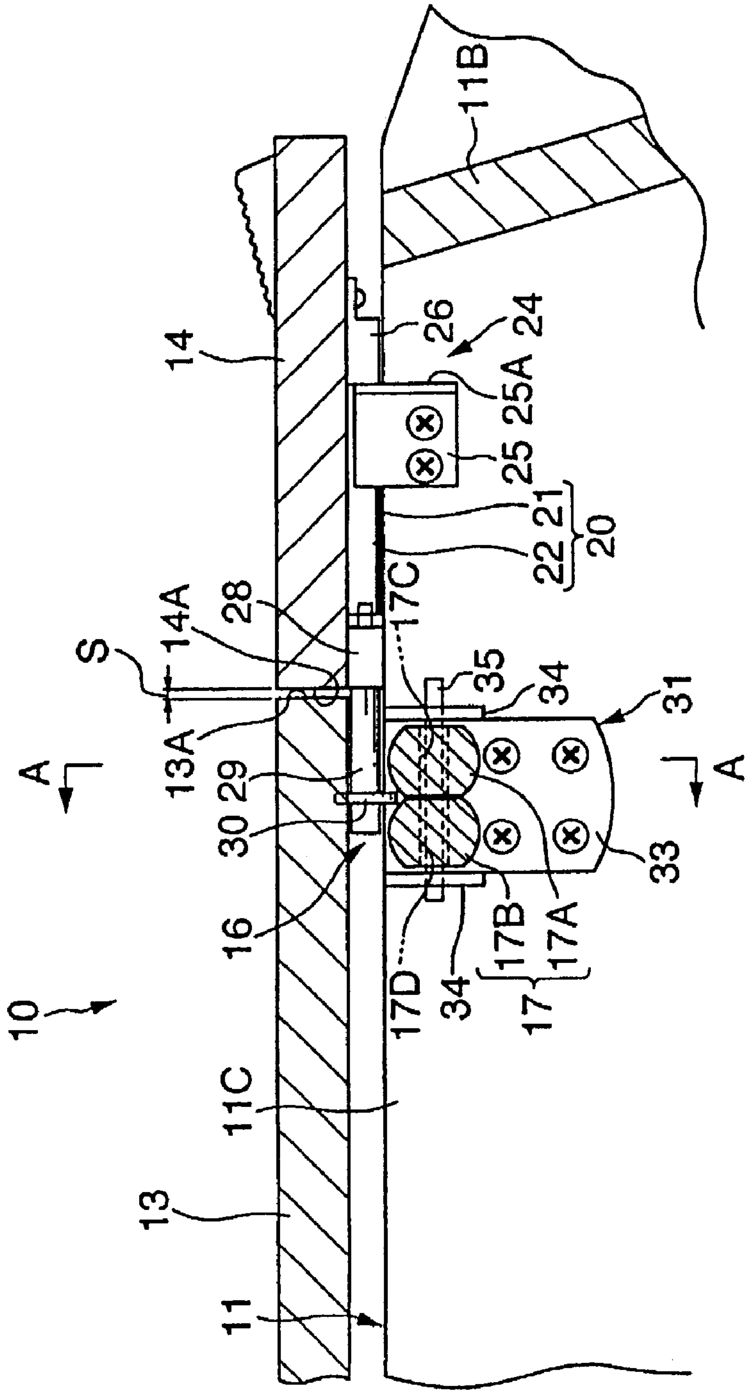
FIG. 2 is an enlarged longitudinal sectional view showing a top board rear and a top board front that are arranged close to each other with a relatively small gap therebetween above the upper portion of a case of the grand piano shown in FIG. 1.

FIG. 2 shows a positional relationship the top board rear 13 and the top board front 14 when closed, wherein they are both arranged horizontally above the upper portion of the case 11 with a small gap S therebetween. That is, a front end 13A of the top board rear 13 is spaced apart from and directly faces with a rear end 14A of the top board front 14 with the gap S, which is set in advance in such a way that they would not come in direct contact with each other when opened and closed, and which is reduced so as not to allow dust to enter into the case 11.

Incidentally, the top board front 14 has a projecting portion 14B that projects backwardly from the rear end 14A in proximity to the hinge 12 (see FIG. 5B), wherein the projecting portion 14B has roughly a triangular shape in side view, whose upper surface is a slope. When the front end

13A of the top board rear 13 is arranged to face with the rear end 14A of the top board rear 14, the projecting portion 14B is received in a hollow 13B formed at the front end 13A of the top board rear 13.

The top board front 14 is arranged on the case 11 such that both ends thereof are interconnected with a left-front end and a right-front end of the case 11 via a pair of sliders 20 (see FIG. 2), which are used to enlarge the gap. Specifically, the sliders 20 are arranged on upper ends of the right-side board 11C and the left-side board 11D (see FIG. 3), wherein each of the sliders 20 is constituted by a lower rail 21 that is extended on the upper end of the right-side board 11C (or left-side board 11D) and an upper rail 22 that is attached to the lower surface of the top board front 14 and is roughly formed in a U-shape in cross section, whose opening is directed downwards, to hold both ends of the lower rail 21. Therefore, the sliders 20 allow the top board front 14 to move in a forward-backward direction of the case 11, thus increasing or decreasing the gap S formed between the top board rear 13 and the top board front 14. In addition, they regulate unwanted left-right movements of the top board front 14. Incidentally, appropriate processing is effected on contact areas between the lower rail 21 and the upper rail 22 so as to reduce frictional resistance therebetween as much as possible. This guarantees that the top board front 14 can move smoothly in forward-backward directions.

Stoppers 24 are arranged in proximity to the sliders 20 in order to regulate a backward movement of the top board front 14, wherein they are respectively fixed to interior walls of the right-side board 11C and the left-side wall 11D by screws, and they comprise angle members 25 having vertical surfaces 25A, which are elongated in left-right directions of the case 11, and block members 26 that are attached to the lower surface of the top board front 14 and come in contact with the vertical surfaces 25A of the angle members 25 as shown in FIG. 2. Therefore, the top board front 14 is regulated in movement in a leftward direction in FIG. 2 to reduce the gap S. Thus, it is possible to reliably prevent the rear end 14A of the top board front 14 from directly colliding with the front end 13A of the top board rear 13.

In addition, an opening motion regulator 16 is arranged to regulate an opening motion of the top board rear 13 once it is closed. The opening motion regulator 16 is constituted by a support member 28 having a block-like shape, which is attached to the lower surface of the top board front 14 in proximity to the rear end 14A, a shaft 29 that is supported by the support member 28 and is elongated backwards below the top board rear 13, and a ring receptor 30 having a semicircular arc shape that is attached to the lower surface of the top board rear 13 in proximity to the front end 13A to receive the tip end of the shaft 29 (see FIG. 2). The length of the shaft 29 and the position for attaching the ring receptor 30 are determined so that when the angle member 25 is brought into contact with the block 26, the tip end of the shaft 29 is positioned inside of the ring receptor 30.

Figure 3:
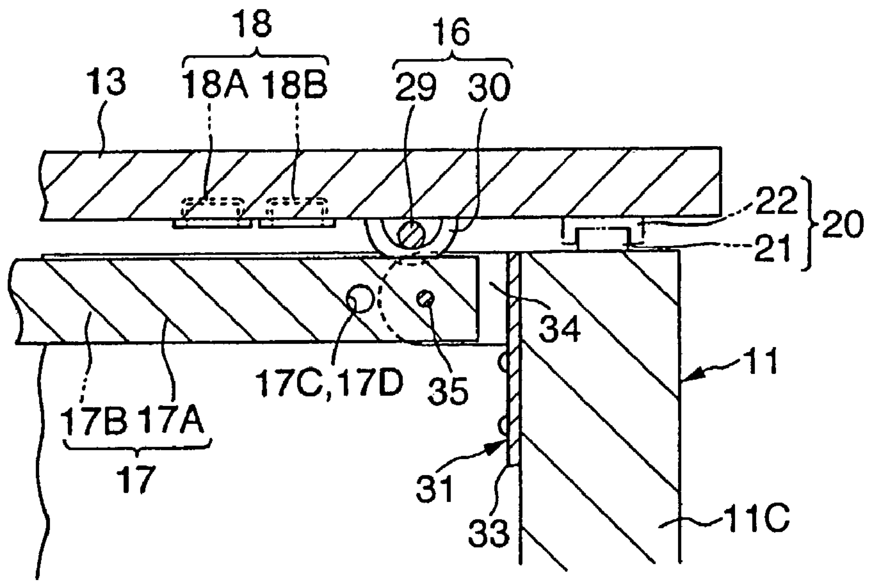
FIG. 3 is a cross sectional view taken along line A-A in FIG. 2.
Figure 4:
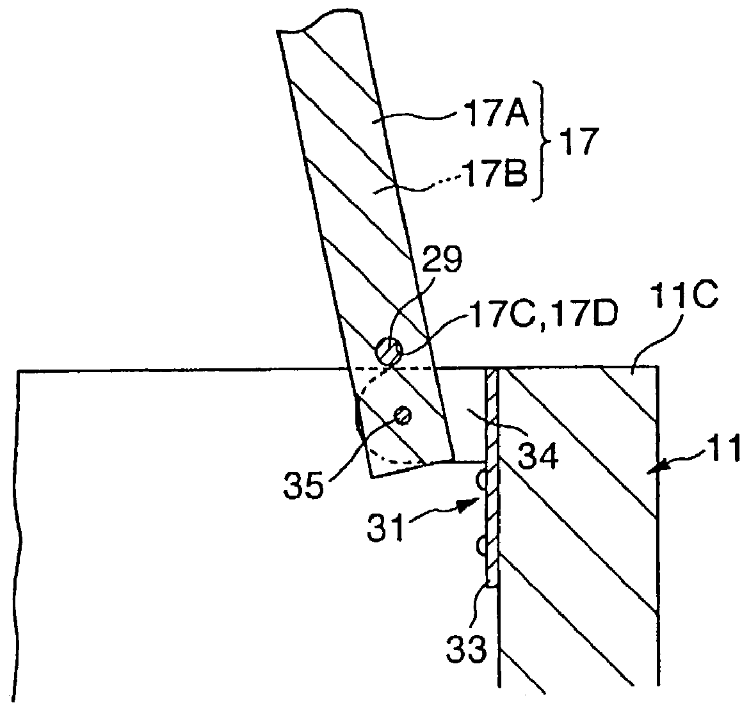
FIG. 4 is a cross sectional view taken along line B-B in FIG. 6.

One end of the support rod 17 is rotatably supported at a prescribed position on the interior wall of the case 11 via a bracket 31, wherein the support rod 17 can be rotatably moved between a stand position for holding the top board rear 13 to be opened and a laid position at which the support rod 17 is completely laid inside of the case 11. Specifically, the support rod 17 is constituted by a pair of rods having different axial lengths that are arranged adjacent to each other, namely, a long rod 17A and a short rod 17B. In addition, the long rod 17A and the short rod 17B have through holes 17C and 17D, both of which are extended towards an axial center of rotation. As shown in FIG. 3, both the through holes 17C and 17D have approximately the same diameter that substantially matches the diameter of the shaft 29. As shown in FIG. 4, the through holes 17C and 17D are formed at prescribed positions such that when the rods 17A and 17B are placed at the stand position for holding the top board rear 13 to be opened, the shaft 29 can be inserted therein.

When the long rod 17A is rotatably moved to the stand position, the short rod 17B is correspondingly moved accompanied with the long rod 17A. Herein, the player (or user) can operate the short rod 17B independently of the long rod 17A; that is, the player can directly hold the short rod 17B and rotatably move it to the stand position, regardless of the long rod 17A.

As shown in FIGS. 2 and 4, the bracket 31 is fixed to the interior wall of the right-side board 11C by screws and is constituted by a fixing portion 33 having a platelike shape that is extended vertically, and a pair of support portions 34 that are arranged adjacent to each other in a width direction of the fixing portion 33 and are overlapped in position within the same vertical plane (see FIG. 4), wherein each of tip ends of the support portions 34 has a roughly semicircular arc shape. A rotation shaft 35 penetrating through base portions of the rods 17A and 17B is bridged between the support portions 34 of the bracket 31, so that the rods 17A and 17B are rotatably supported by the bracket 31 via the rotation shaft 35.

The receiving pan 18 is arranged on a corner of the back of the top board rear 13 in proximity to the front end 13A. Specifically, the receiving pan 18 is constituted by a pair of pans 18A and 18B (see FIG. 1), which are arranged adjacent to each other along the front end 13A of the top board rear 13. That is, the pan 18A receives the tip end of the long rod 17A that is moved to the stand position, while the pan 18B receives the tip end of the short rod 17B that is moved to the stand position.

Figure 5A:
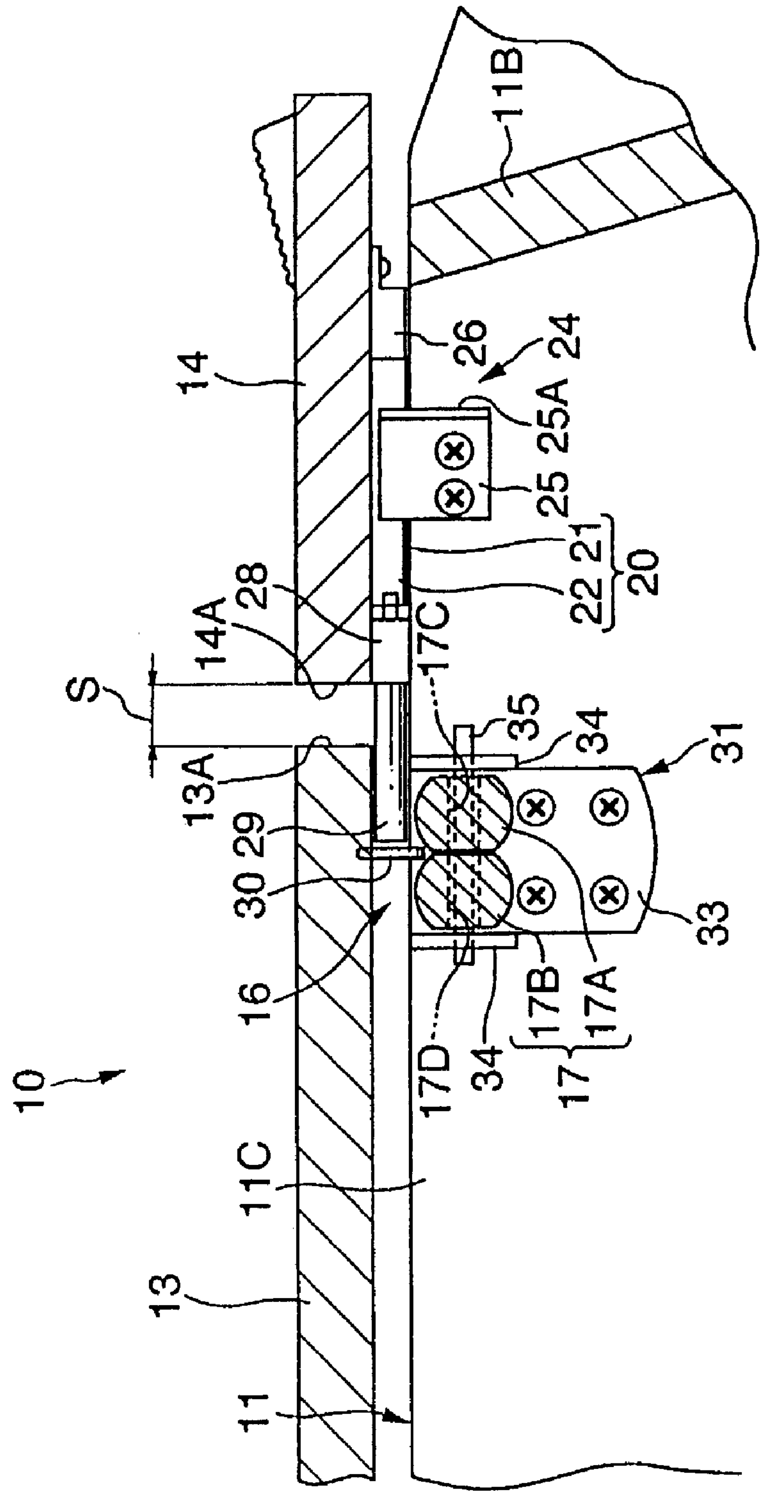
FIG. 5A is an enlarged longitudinal sectional view showing the top board rear and top board front that are spaced apart from each other with a relatively large gap therebetween.

Next, the overall operation of the top board structure of the present embodiment will be described with respect to a transition from a closed state of the top board rear 13 to an opened state of the top board rear 13 as shown in FIG. 1. First, the top board front 14 is moved forward to enlarge the gap S as shown in FIG. 5A, so that the tip end of the shaft 29 is completely extracted from the ring receptor 30 to allow the top board rear 13 to be opened, wherein the top board rear 13 will be subjected to initial opening motion. That is, the player (or user) can put finger tips into the gap S to hold the front end 13A of the top board rear 13. Thus, the top board rear 13 is greatly opened; then, the long rod 17A is rotatably moved from the laid position to the stand position. The tip end of the long rod 17A is received by the pan 18A formed on the back of the top board rear 13. Thus, it is possible to securely maintain the top board rear 13 in an opened state.

Figure 6:
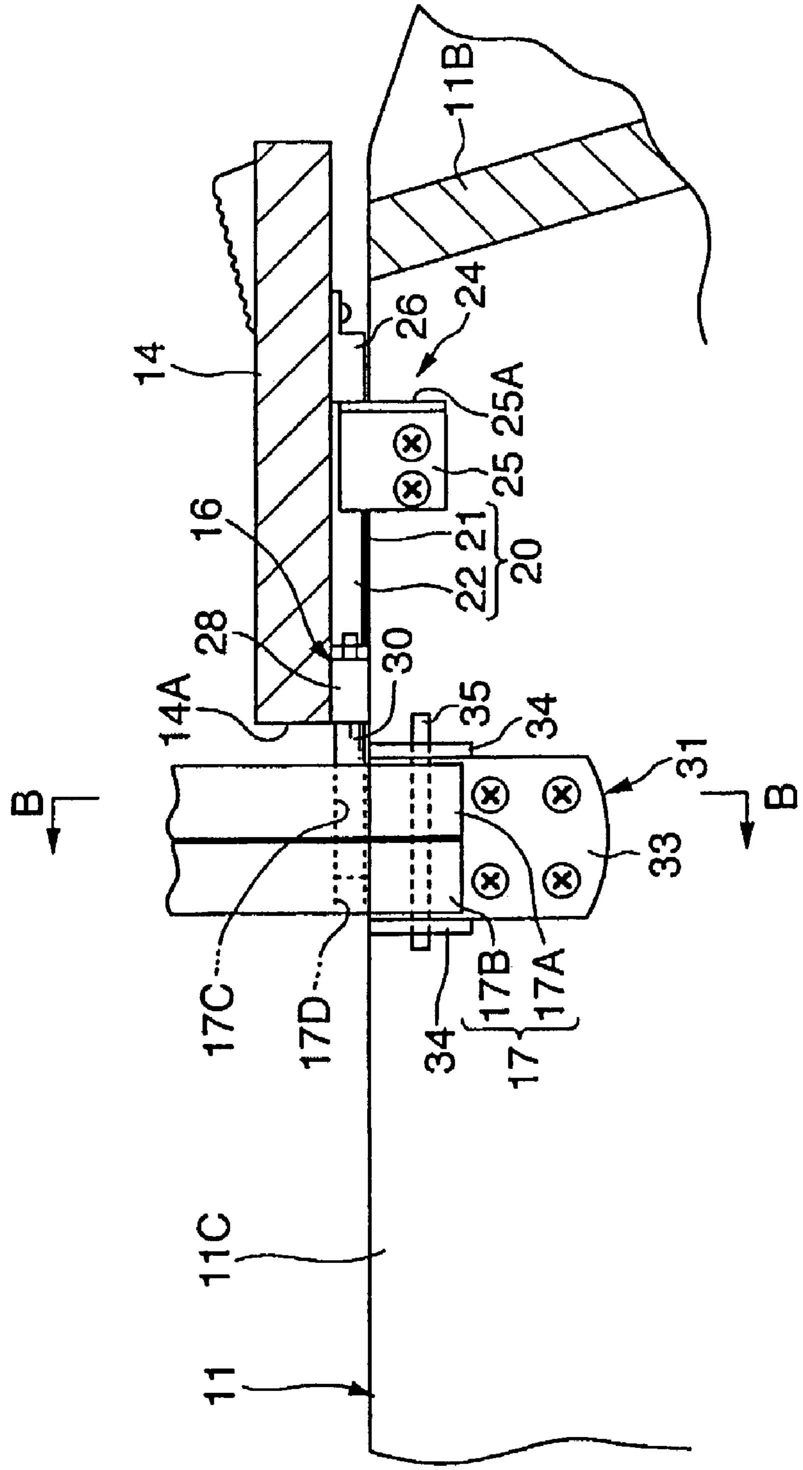
FIG. 6 is an enlarged longitudinal sectional view showing an opened state of the top board rear that is initially arranged close to the top board front as shown in FIG. 2.

In the aforementioned condition, the top board front 14 is moved backwards to an initial position thereof as shown in FIGS. 4 and 6, so that the shaft 29 is inserted into the through holes 17C and 17D. This controls the rods 17A and 17B not to be moved unexpectedly; therefore, both the rods 17A and 17B can be securely held to match the stand position.

Next, when the top board rear 13 is closed, the top board front 14 is moved forward so as to extract the shaft 29 from the through holes 17C and 17D; then, the top board rear 13 is slightly moved to be further opened, thus allowing the tip end of the long rod 17A to be taken off from the pan 18A on the back of the top board rear 13. After the long rod 17A is laid down inside of the case 11, the top board rear 13 is closed and is slowly mounted on the upper portion of the case 11. In this case, the gap S is enlarged as shown in FIG. 5A; therefore, the player (or user) can hold the front end 13A of the top board rear 13 by hand(s) so as to terminate a closing operation of the top board rear 13.

According to the first embodiment described above, the opening motion regulator 16 adequately regulates an opening motion of the top board rear 13 and maintains the support rod 17 at the stand position. That is, the gap S is automatically enlarged not only in an opened state of the top board rear 13 but also in a closed state of the top board rear 13. Therefore, even when the player (or user) holds the front end 13A of the top board rear 13 with fingers so as to open or close the top board rear 13 by hand(s), it is possible to reliably prevent finger tips from being unexpectedly caught in the gap between the front end 13A of the top board rear 13 and the rear end 14A of the top board front 14. In addition, it is possible to reliably prevent the top board rear 13 from being suddenly closed because the support rod 17 would not be easily laid down due to unexpected shock or impact applied to the grand piano.

This invention is not necessarily limited to the first embodiment described above; hence, it is possible to modify the top board structure adapted to a grand piano in a variety of ways, which will be described below, wherein parts identical to those used in the first embodiment are designated by the same reference numerals; hence, the descriptions thereof will be omitted as necessary.

2. Second Embodiment

Figure 9:
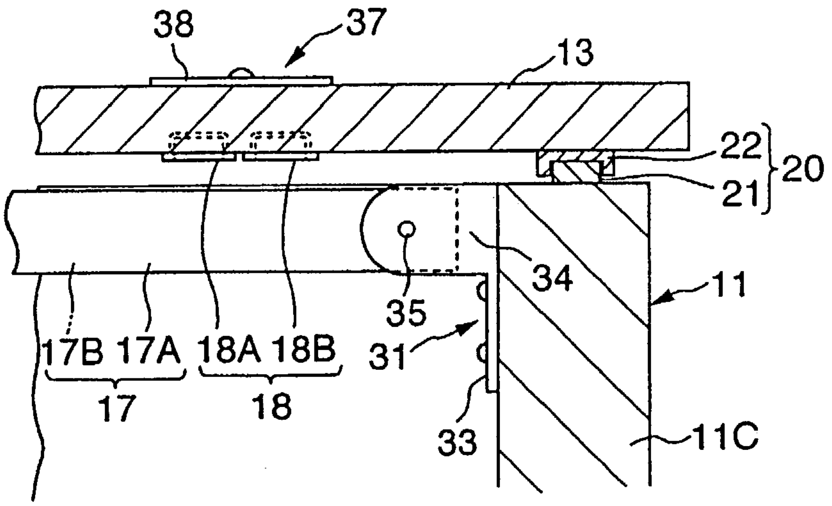
FIG. 9 is a cross sectional view taken along line C-C in FIG. 7.
Figure 10:
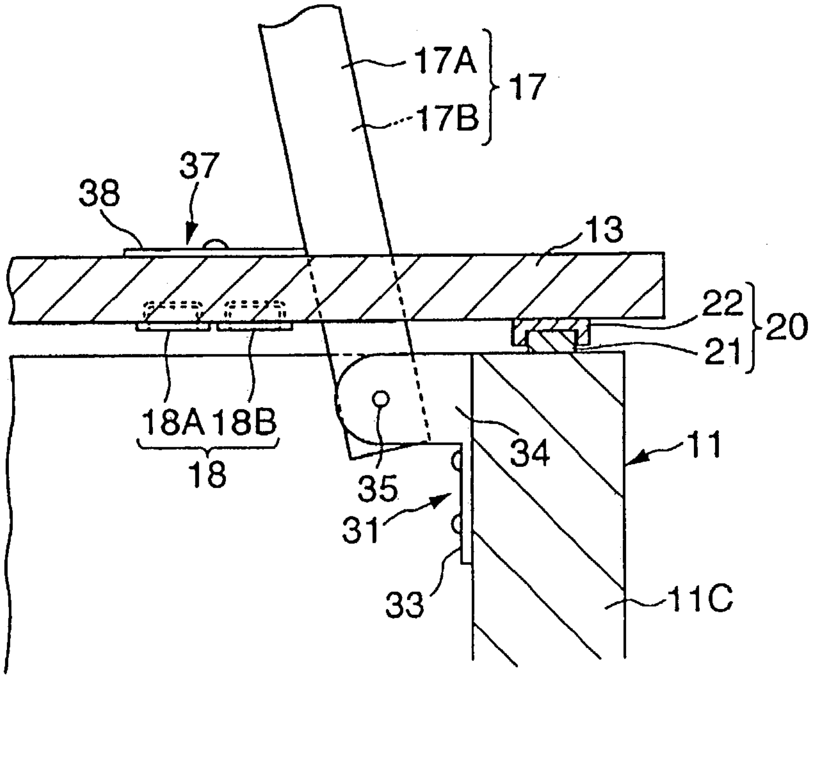
FIG. 10 is a cross sectional view taken along line C-C in FIG. 7, wherein the top board rear is opened and is supported by a support rod in a stand position.

A top board structure of a second embodiment of the invention will be described with reference to FIGS. 7 to 10, wherein the second embodiment is characterized in that an opening motion regulator 37 is arranged on upper surfaces of the top board rear 13 and the top board front 14. That is, the opening motion regulator 37 is constituted by a plate member 38 that is arranged on the upper surfaces of the top board rear 13 and the top board front 14. Specifically, a front portion of the plate member 38 is fixed to the upper surface of the top board front 14 and is located above the gap S, while a rear portion is mounted on the upper surface of the top board rear 13. FIGS. 9 and 10 are cross sectional views taken along line C-C in FIG. 7, wherein the plate member 38 is elongated in left-right directions in such a way that when the support rod 17 is placed in the stand position (see FIG. 10), the right end of the plate member 38 comes in contact with the base portion of the support rod 17. Herein, at least one plate member 38 is arranged on both sides of the rear portion 14A of the top board front 14. Alternatively, plural plate members can be arranged with prescribed distances therebetween along the rear end 14A of the top board front 14.

Figure 8A:
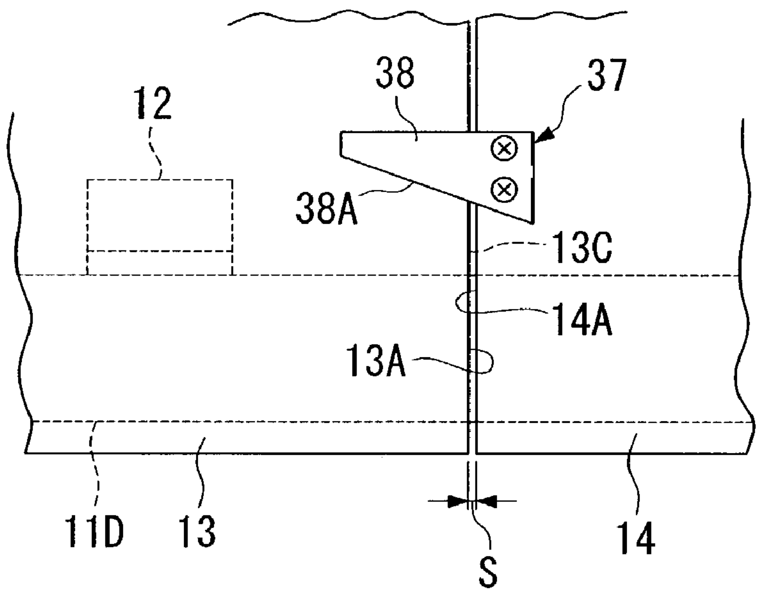
FIG. 8A is a plan view in which the top board rear and top board front are arranged close to each other with a gap therebetween by way of a plate member having a linear edge slanted in proximity to a hinge.
Figure 8B:
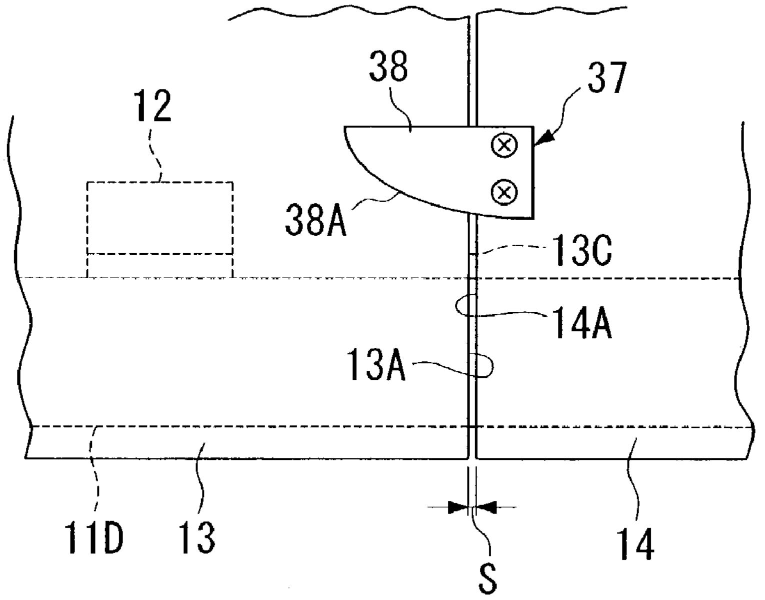
FIG. 8B is a plan view in which the top board rear and top board front are arranged closed to each other with a gap therebetween by way of a plate member having a curved edge slanted in proximity to the hinge.

FIGS. 8A and 8B are plan views in which the top board rear 13 and the top board front 14 are arranged closed to each other with a gap S therebetween by way of the plate member 38, wherein the plate member 38 has a slanted edge 38A, which is slanted so as to be gradually distanced from the hinge 12 in a direction towards the hinge 12. Herein, the slanted edge 38A of the plate member 38 can be formed in a linear manner as shown in FIG. 8A, or it can be formed in a curved manner as shown in FIG. 8B. When plural plate members are arranged, it may be required that at least one plate member proximate to the hinge 12 has such a slanted edge.

Figure 7:
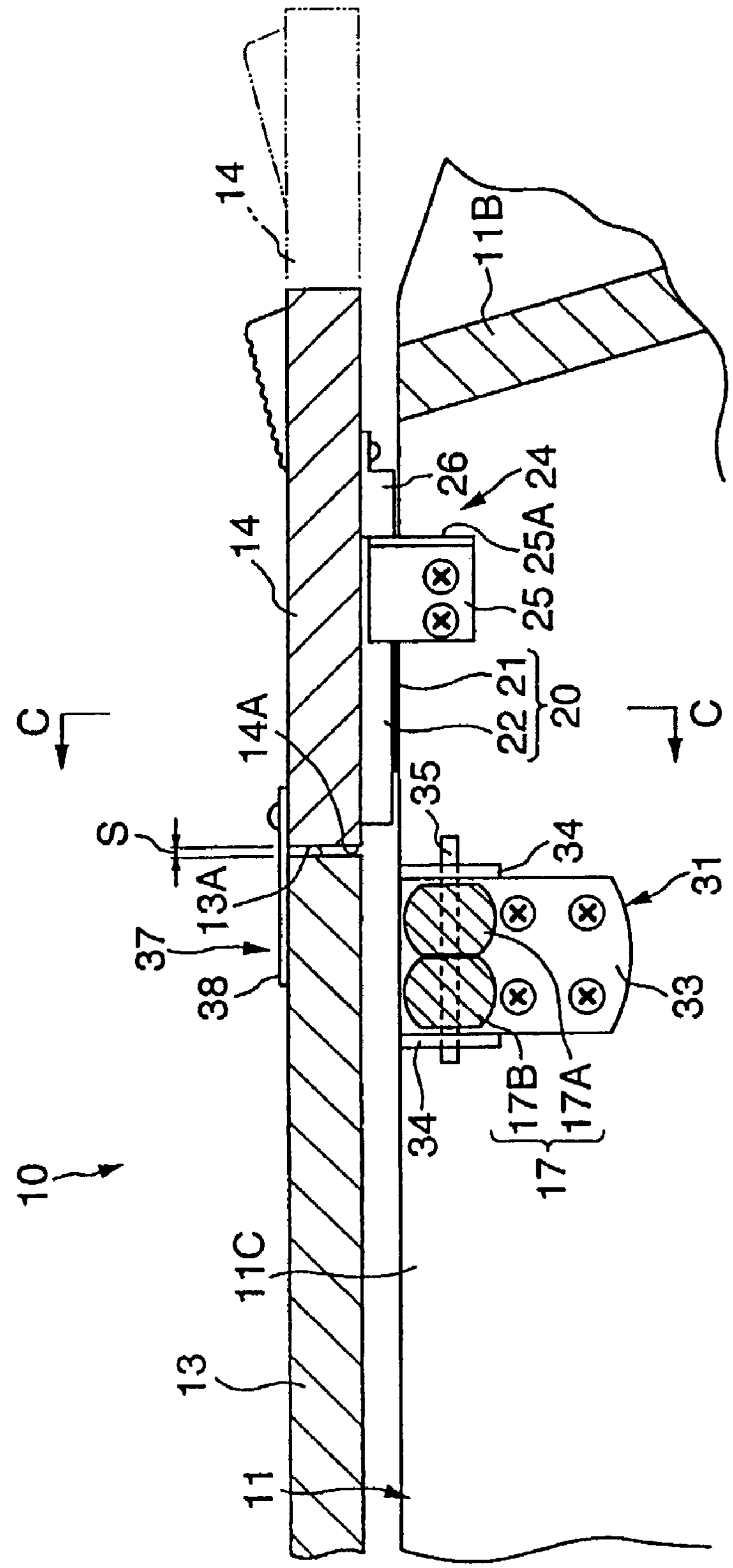
FIG. 7 is an enlarged longitudinal sectional view showing a top board rear and a top board front that are arranged close to each other with a relatively small gap therebetween above the upper portion of a case of a grand piano in accordance with a second embodiment of the invention.

In the second embodiment, the plate member 38 applies downward pressure to the top board rear 13 to be regulated in opening motion as shown in FIGS. 7 and 9. In this state, the top board front 14 is moved forward so that the plate member 38 is spaced apart from the upper surface of the top board rear 13, which is then subjected to an initial opening motion. The top board rear 13 is opened and is then supported by the long rod 17A that is rotatably moved to the stand position. Thereafter, as shown in FIG. 10, the top board front 14 is restored to the initial position, so that the plate member 38 is brought in contact with the base portion of the support rod 17, whereby the rods 17A and 17B are securely regulated in further rotation.

Before the top board rear 13 is closed, the top board front 14 is moved forwards to release the rods 17A and 17B from being regulated in rotation. After the rods 17A and 17B are laid down, the top board rear 13 is mounted on the case 11 of the grand piano. When the top board front 14 is unexpectedly moved backwards to reduce the gap S during a closing motion of the top board rear 13, an angular portion 13C formed on the lower portion of the top board rear 13 (see FIG. 5B) may slide along the slanted edge 38A of the plate member 38 to automatically move the top board front 14 forwards, thus enlarging the gap S. Thus, it is possible to reliably prevent player's fingers from being caught in the gap S between the front end 13A of the top board rear 13 and the rear end 14A of the top board front 14.

According to the second embodiment, it is possible to obtain satisfactory effects and desired operations similar to those of the first embodiment. Due to the provision of the plate member 38 located on the top board rear 13 and the top board front 14 in the second embodiment, the player (or user) can visually recognize the opening motion regulator 37 with ease; therefore, it becomes easy for the player to recognize whether or not the top board rear 13 can be opened.

3. Third Embodiment

Figure 11:
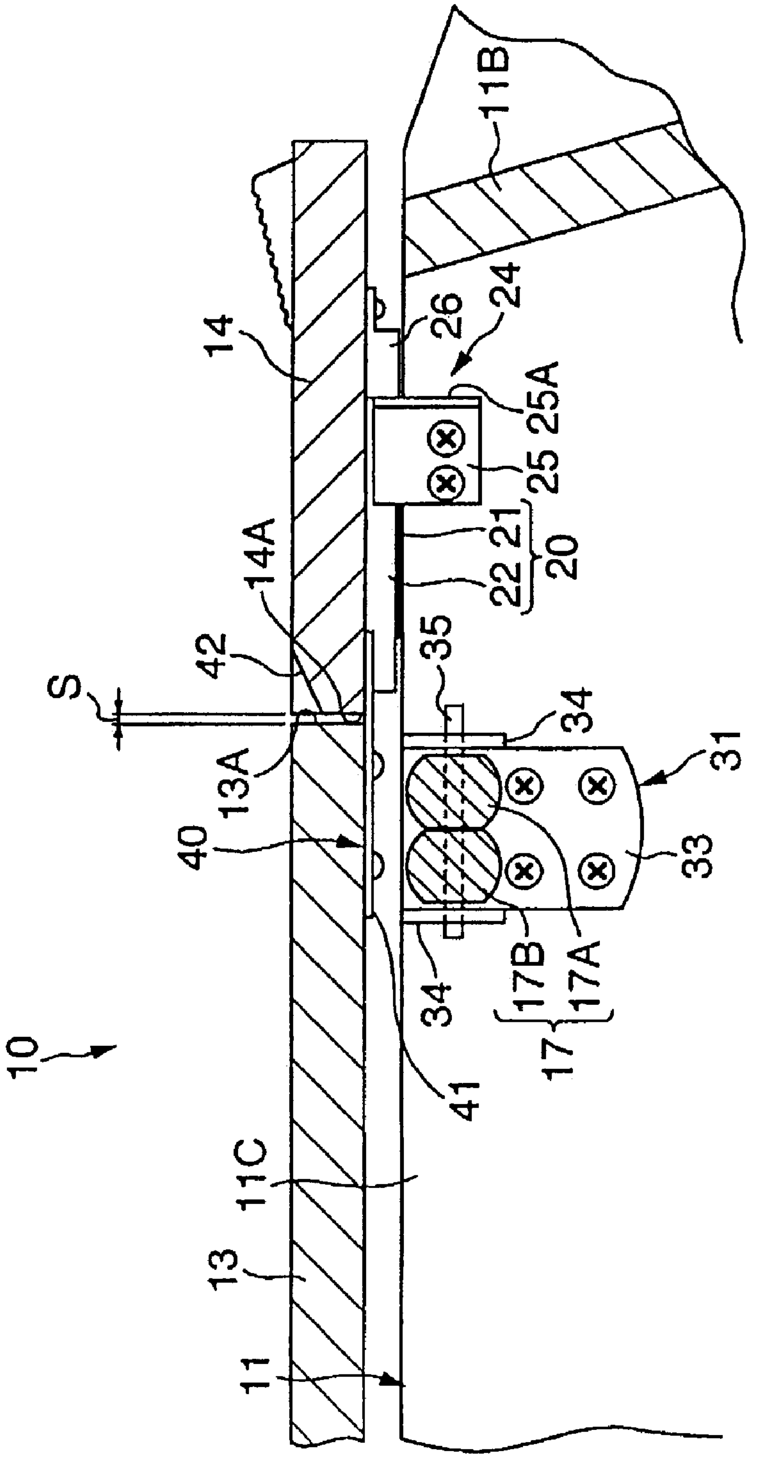
FIG. 11 is an enlarged longitudinal sectional view showing a top board rear and a top board front that are arranged close to each other with a relatively small gap therebetween above the upper portion of a case of a grand piano in accordance with a third embodiment of the invention.

A top board structure of a third embodiment of the invention will be described with reference to FIG. 11, wherein an opening motion regulator 40 is constituted by a plate member 41 that is arranged beneath lower surfaces of the top board rear 13 and the top board front 14. That is, a rear portion of the plate member 41 is fixed to the lower surface of the top board rear 13 by screws, while a front portion is arranged in contact with the lower surface of the top board front 14. Thus, as shown in FIG. 11, the top board front 14 is partially mounted on the plate member 41 to regulate the top board rear 13 in an opening motion. In addition, when the top board front 14 is moved forward to enlarge the gap S, the top board rear 13 can be subjected to an opening motion. Incidentally, the plate member 41 is fixed to the lower surface of the top board rear 13 at a prescribed position (or prescribed positions) in the width direction of the top board rear 13 to ensure the front portion thereof to be reliably brought into contact with the lower surface of the top board front 14. For example, it is possible to arrange a pair of plate members in proximity to the free end of the top board rear 13 and the hinge 12 respectively, or one plate member is arranged in proximity to either one of them. Alternatively, it is possible to arrange plural plate members in the width direction of the top board rear 13 by prescribed distances therebetween.

Specifically, a slope (or slopes) 42 is formed on an upper corner of the rear end 14A of the top board front 14. During a closing motion of the top board rear 13, even when the top board front 14 is positioned backwards so that the plate member 41 is brought into contact with the slope 42, the top board front 14 is automatically moved forwards while the plate member 41 slides on the slope 42. As a result, it is possible to enlarge the gap S between the front end 13A of the top board rear 13 and the rear end 14A of the top board front 14; thus, it is possible to reliably prevent player's fingers from being caught in the gap S. Incidentally, it is possible to form the slope 42 entirely over the rear end 14A of the top board front 14 in the width direction. Alternatively, it is possible to form the slope 42 only at a selected position in proximity to the plate member 41.

In the third embodiment similarly to the first embodiment, it is possible to reliably maintain the top board rear 13 at an opened position. Before the top board rear 13 is started to be opened, the top board front 14 is moved forwards so that the plate member 41 is securely spaced apart from the rear end 14A of the top board front 14, in other words, it is moved forwards so as not to be interfered with the plate member 41 during an opening motion of the top board rear 13.

According to the third embodiment similarly to the foregoing embodiments, it is possible to maintain an enlarged condition of the gap S when the top board rear 13 is opened and closed.

4. Fourth Embodiment

Figure 12:
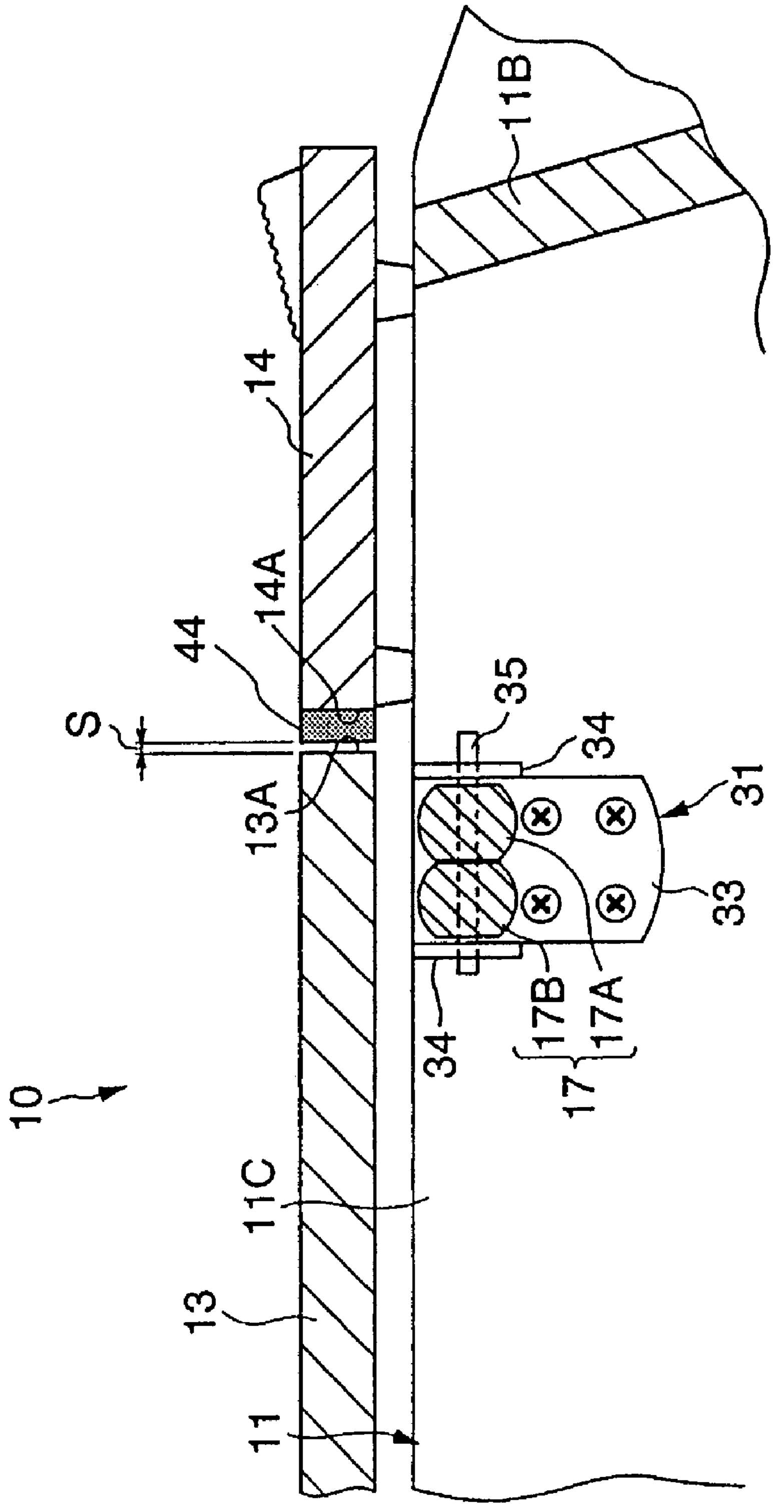
FIG. 12 is an enlarged longitudinal sectional view showing a top board rear and a top board front that are arranged close to each other with a relatively small gap therebetween above the upper portion of a case of a grand piano in accordance with a fourth embodiment of the invention.

A top board structure of a fourth embodiment of the invention will be described with reference to FIG. 12, wherein a buffer member 44 is arranged to enlarge the gap S between the top board rear 13 and the top board front 14. Specifically, the buffer member 44 is arranged between the front end 13A of the top board rear 13 and the rear end 14A of the top board front 14, wherein it is made of a foaming resin material and the like having a cushion property. Alternatively, the buffer member 44 is attached to the rear end 14A of the top board front 14, which is spaced apart from the front end 13A of the top board rear 13 with the gap S therebetween. When the player (or user) puts fingers into the gap S, the buffer member 44 contracts to enlarge the gap S, which would not cause burden or load to player's finger tips.

According to the fourth embodiment, it is possible to obtain satisfactory effects similarly to those of the foregoing embodiments. In addition, the fourth embodiment can simplify the overall structure of a grand piano because it is possible to omit the aforementioned sliders 20 and stoppers 24.

5. Fifth Embodiment

Figure 13:
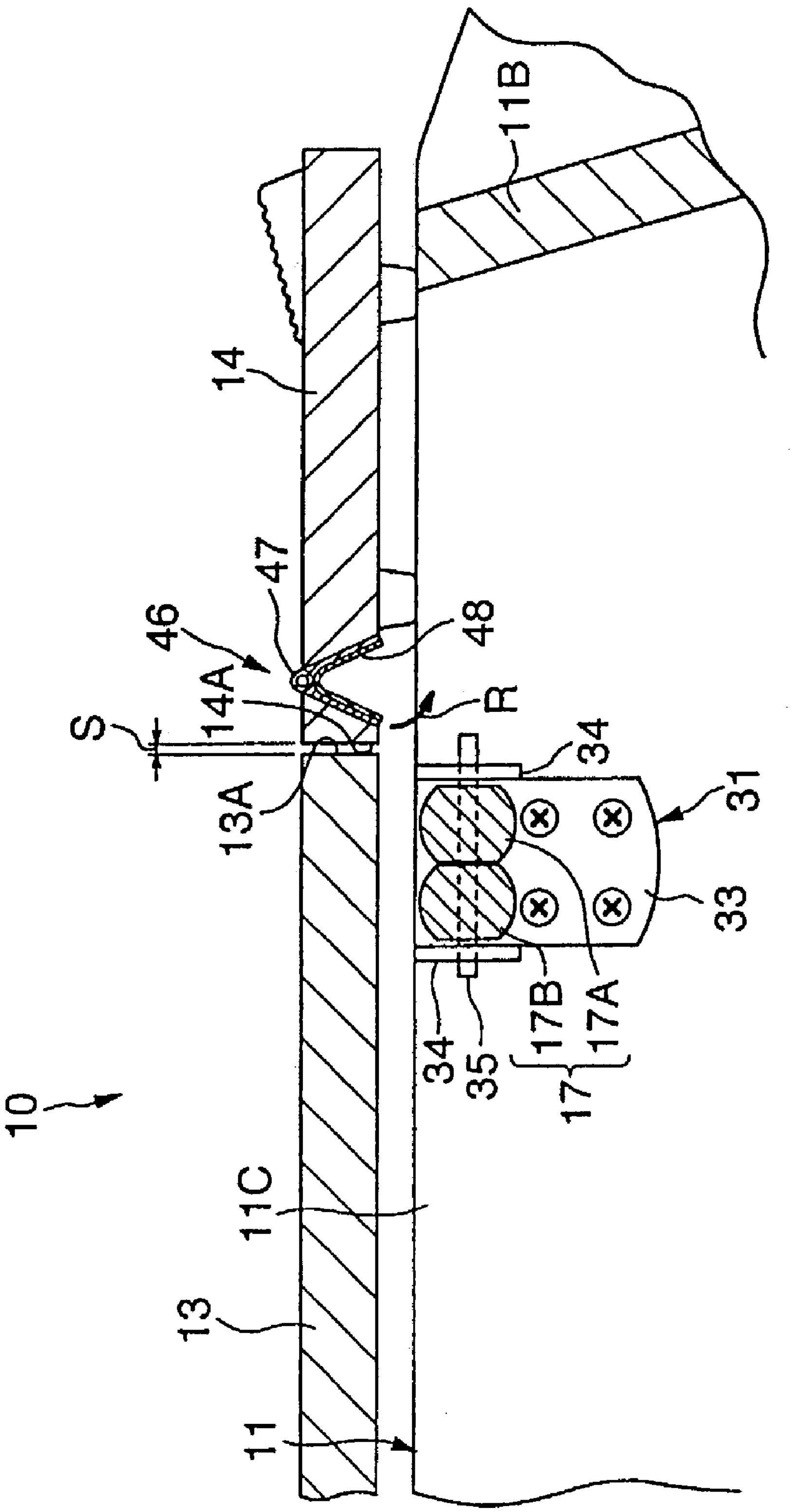
FIG. 13 is an enlarged longitudinal sectional view showing a top board rear and a top board front that are arranged close to each other with a relatively small gap therebetween above the upper portion of a case of a grand piano in accordance with a fifth embodiment of the invention.

A top board structure of a fifth embodiment of the invention will be described with reference to FIG. 13, wherein a gap enlarging structure 46 is arranged to cause displacement on the rear end 14A of the top board front 14. Specifically, the gap enlarging structure 46 is realized by splitting, at a prescribed position spaced apart from the rear end 14A, the top board front 14 into two pieces, between which a hinge (or hinges) 47 is arranged. In addition, a plate spring 48 having an angle shape in cross section is attached to interior walls of the hinge 47, which is arranged at the split position of the top board front 14. The plate spring 48 works to maintain the upper surface of the top board front 14 at the split position to be normally planar. When player's fingers are put into the gap S, the plate spring 48 is elastically deformed to allow the 'split' rear end portion (e.g., 14A) of the top board front 14 to rotate in a direction R in FIG. 13, so that the top board front 14 is partially deformed to enlarge the gap S.

According to the fifth embodiment, it is possible to obtain satisfactory effects similarly to those of the fourth embodiment.

The aforementioned embodiments are all described with respect to a grand piano having a pair of the top board rear 13 and the top board front 14. Of course, the number of top boards covering the upper portion of the case 11 of the grand piano is not necessarily limited to two; therefore, it is possible to increase the number of top boards to three or more. In summary, this invention is designed to allow the gap between first and second top boards, which are arranged close to each other above the case of the grand piano, for example.

Figure 5B:
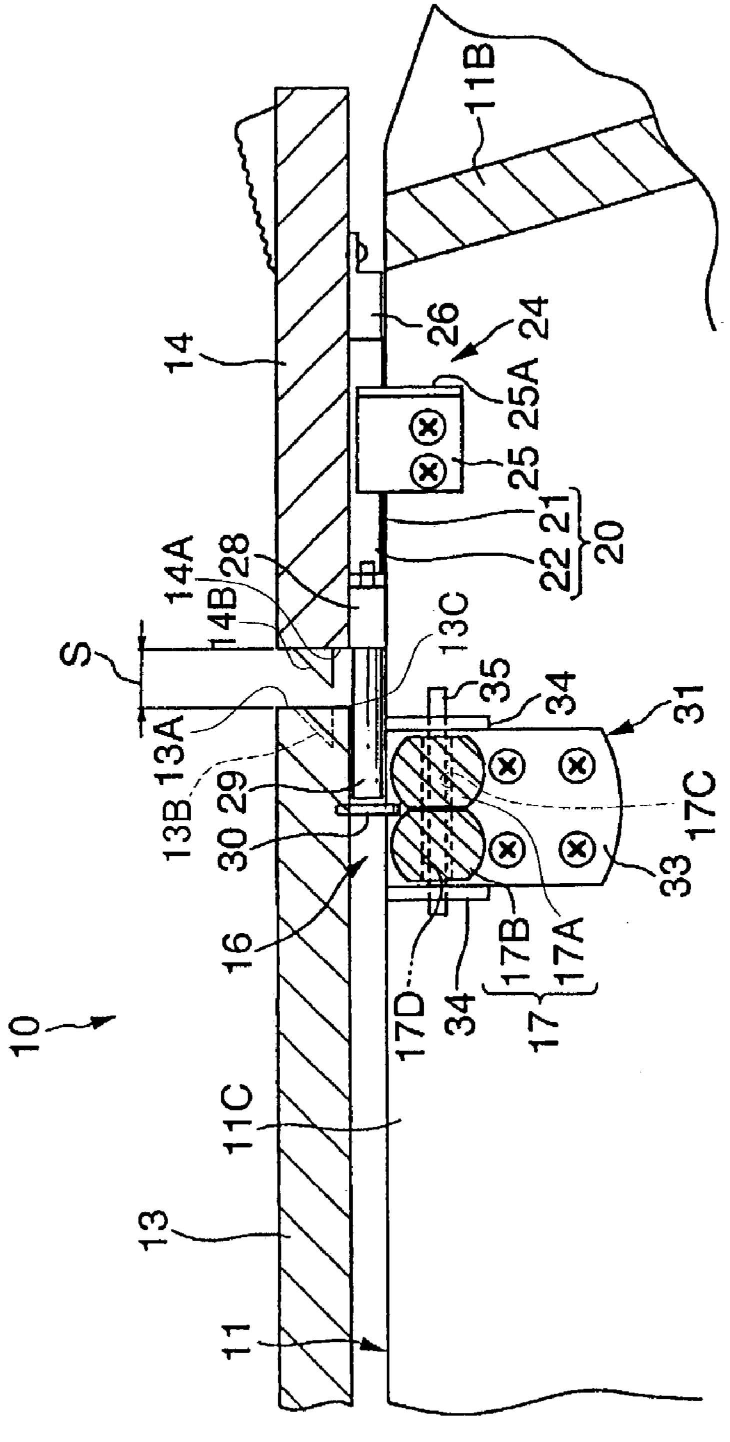
FIG. 5B is an enlarged longitudinal sectional view showing a modified example of the top board structure shown in FIG. 5A.

In the top board structure shown in FIG. 5B, it is possible to modify the hollow 13B of the top board rear 13 and the projecting portion 14B of the top board front 14 in shapes and dimensions. For example, a projecting portion is formed to project from the front end 13A of the top board rear 13, under which a slope is formed; and a hollow is formed on the rear end 14A of the top board rear 14 to receive the projecting portion. That is, it is possible to obtain similar effect and operation even when an engaging relationship between the top board rear 13 and the top board front 14 is changed as described above. Of course, it is possible to omit the hollow 13B and the projecting portion 14B as shown in FIG. 5A. Due to the provision of them, it is possible to reliably enlarge the gap S in accordance with a closing motion of the top board rear 13 even when the top board front 14 is unexpectedly moved backwards after the long rod 17A is laid down.

The aforementioned embodiments are essentially adapted to a grand piano but are not necessarily limited to such an application. For example, the aforementioned embodiments can be adapted to other types of keyboard instruments, examples of which are disclosed in Japanese Unexamined Patent Publication No. Hei 8-101687 and Japanese Unexamined Patent Publication No. Hei 5-313656, wherein upon detection of key-depression speeds and hammer-striking intensities, musical tones are produced in response to detection results.

Figure 14:
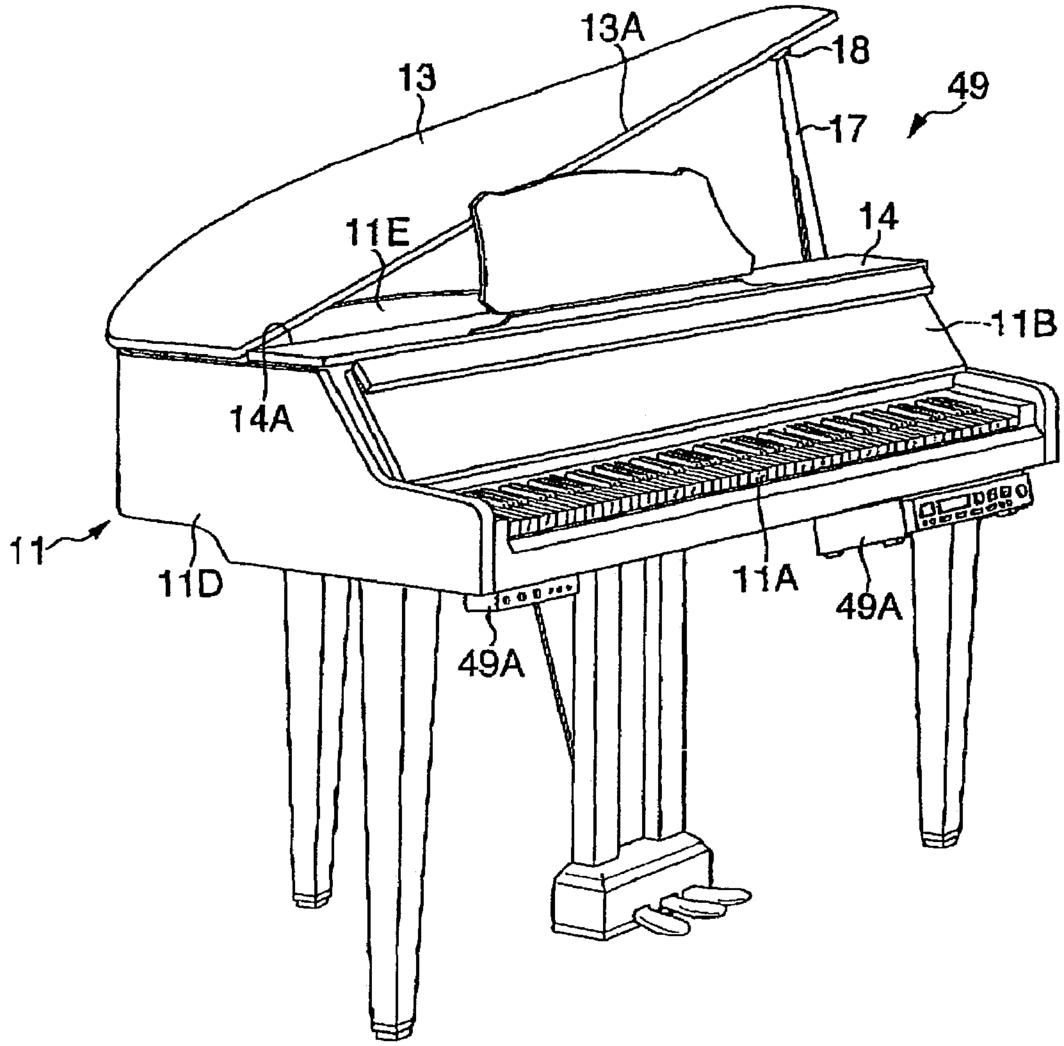
FIG. 14 is a perspective view showing a grand-piano-like electronic keyboard instrument applicable to the top board structure of the foregoing embodiments.

An example of the aforementioned keyboard instrument will be described with reference to FIG. 14, which shows a grand-piano-like electronic keyboard instrument (or an electronic piano) 49 having a top board structure as described in the foregoing embodiments, wherein control units 49A are arranged beneath a keyboard 11A. The control units 49A comprises electronic sound sources as well as electric circuitry comprising a bus 50, a CPU 51, a ROM 52, a hammer sensor interface 56, panel switches 57, a panel interface 58, a sound source circuit 59, a timer 61, and a RAM 62.

Details of the electric circuitry used in the keyboard instrument 49 will be described with reference to FIG. 15, wherein the CPU 51 performs various controls based on control programs stored in the ROM 52 with respect to various blocks, which are interconnected thereto via the bus 50. Specifically, the ROM 52 has two types of tables α and β used for converting key-depression speeds, detected by first optical sensors (not shown), to string-striking intensities (namely, velocities), as well as another table for converting string-striking speeds, detected by second optical sensors (not shown), to velocities, wherein it is possible to produce velocities from outputs of optical sensors with reference to these tables.

In the above, the table α arranged relative to first optical sensors is used to convert key-depression speeds to normal velocities, wherein the table content thereof is prepared in response to normal key-depressing operations. The table β is used to convert key-depression speeds to relatively low velocities, wherein the table content thereof is prepared to simulate intense key-depressing operations (to depress keys deeply) and/or high-speed key-depressing-and-releasing operations performed just after low-speed key-releasing operations.

Figure 15:
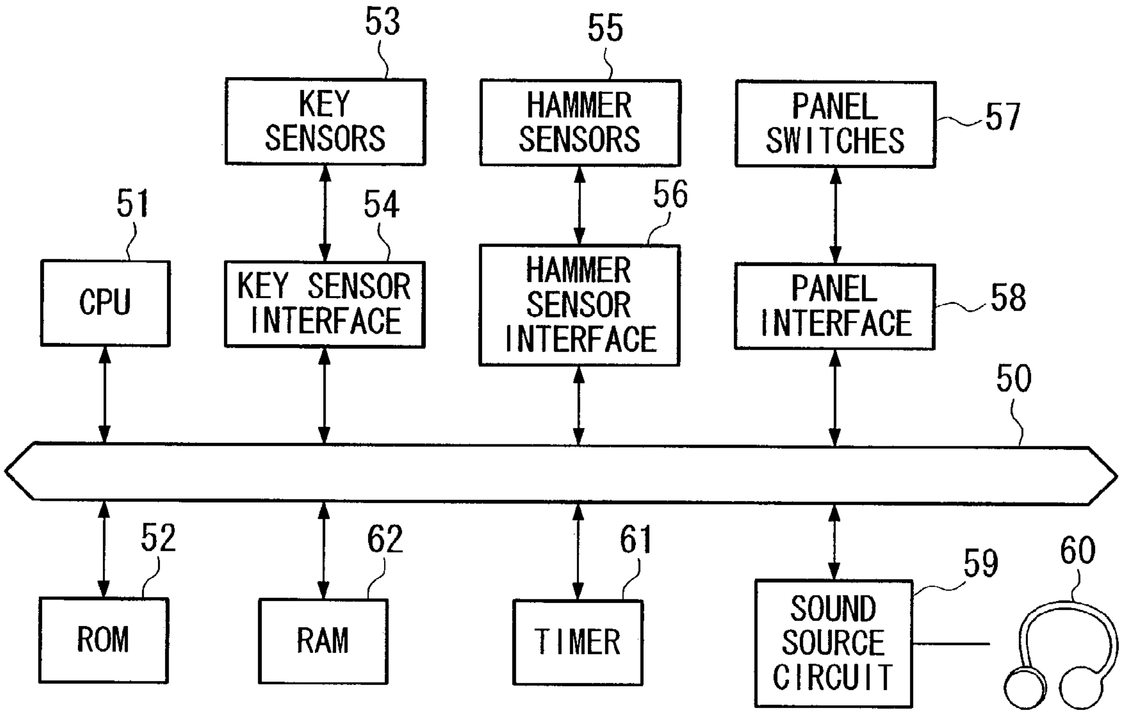
FIG. 15 is a block diagram showing an electronic configuration of circuitry installed in the electronic keyboard instrument shown in FIG. 14.

In FIG. 15, reference numeral 53 designate key sensors collectively, i.e., first optical sensors that are arranged for eighty-eight keys respectively. That is, the keyboard 11A comprises eighty-eight keys equipped with eighty-eight first optical sensors. Outputs of the key sensors 53 are supplied to the CPU 51 via a key sensor interface 54 and the bus 50.

Reference numeral 55 designate hammer sensors collectively, i.e., second optical sensors that are arranged for hammer actions (not shown) in connection with eighty-eight keys of the keyboard 11A. That is, eighty-eighty keys of the keyboard 11A are interlocked with hammer actions equipped with eighty-eight second optical sensors. Outputs of the hammer sensors 55 are supplied to the CPU 51 via the hammer sensor interface 56 and the bus 50.

Reference numeral 57 designate panel switches, which are set by a player (or a user) and some of which is interconnected with a display, wherein panel switches are arranged on an operation panel of the keyboard instrument 49. Setup information of panel switches 57 is supplied to the CPU 51 via the panel interface 58 and the bus 50. Upon operation of the panel switches 57, the keyboard instrument 49 allows the player (or user) to arbitrarily select either normal performance or muting (or silencing) performance. Upon selection, hammer actions are adequately controlled.

Reference numeral 59 designates a sound source circuit, which synthesizes and produces musical tone signals based on performance information supplied from the CPU 51. Specifically, the keyboard instrument 49 activates the sound source circuit 59 to produce a musical tone upon receipt of a keycode representing a tone pitch and a note-on (or a tone-generation instruction) supplying a velocity representing a tone volume (or sound intensity) when a key is depressed. Then, it controls the sound source circuit 59 to stop the musical tone upon receipt of a note-off (or a mute instruction) when the key is off (i.e., K2 off state).

Musical tone signals produced by the sound source circuit 59 are reproduced in a headphone set 60 applied to player's ears. Reference numeral 61 designates a timer that periodically supplies an interrupt signal to the CPU 51 in each prescribed time. Therefore, the CPU 51 performs an interrupt process upon receipt of such an interrupt signal, so that various registers (not shown) are incremented or decremented as necessary.

Reference numeral 62 designates a RAM in which various registers are created and are adequately accessed by the CPU 51.

As described heretofore, this invention has a variety of effects and technical features, which will be described below.

(1) A top board structure of this invention adapted to a grand piano is designed to allow a gap between first and second top boards, which are arranged close to each other above a case, to be enlarged as necessary. This provides a sufficiently great space allowing insertion of fingers into the space between the first and second top boards. Therefore, during an opening or closing motion of the first top board (e.g., top board rear), it is possible to effectively prevent a player (or a user) from being anxious that finger tips will be caught in the gap between the first and second top boards. In addition, the player can securely start an opening motion or terminate a closing motion while holding the free end of the first top board with fingers. In other words, the player is not necessarily required to again take hold of the free end of the first top board by changing positions of fingers. Therefore, it becomes possible for the player to smoothly perform opening and closing motions with respect to the first top board.

(2) In the above, the gap between the first and second top boards is controlled by a prescribed mechanical structure adapted to the grand piano, wherein the second top board (e.g., top board front) can be easily or automatically moved forwards to enlarge the gap. Alternatively, it is possible to control the gap by introducing partial deformation or displacement in the second top board, wherein a buffer member is arranged in the gap, or the second top board is designed to allow partial deformation or displacement when the player puts fingers into the gap. Thus, it is possible to reliably prevent a player's fingers from being injured during an opening motion and/or a closing motion of the first top board.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A top board structure adapted to a keyboard instrument, comprising:

a first top board that is pivotally supported at one end of a case of the keyboard instrument to be closed and opened;

a second top board that is arranged close to the first top board above the case of the keyboard instrument; and a gap enlarging structure for selectively enlarging a horizontal gap between the first top board and the second top board when the boards are substantially co-planar.

2. A top boa:rd structure adapted to a keyboard instrument, comprising:

a first top board that is pivotally supported at one end of a case of the keyboard instrument to be closed and opened; and a second top board that is arranged close to the first top board above the case of the keyboard instrument, wherein the second top board is movable so as to enlarge a gap between the first top board and the second top board, and wherein the first top board is allowed to be opened or closed only when the second top board is moved to enlarge the gap.

3. A top board structure adapted to a keyboard instrument, comprising:

a first top board that is pivotally supported at one end of a case of the keyboard instrument to be closed and opened;

a second top board that is arranged close to the first top board above the case of the keyboard instrument, wherein the second top board is movable so as to enlarge a gap between the first top board and the second top board; and a support rod for supporting the first top board opened at a stand position, wherein the first top board is allowed to be opened or closed only when the second top board is moved to enlarge the gap, and wherein the support rod securely supports the first top board to be maintained at the stand position when the second top board is restored to an initial position thereof.

4. A top board structure adapted to a keyboard instrument, comprising:

a first top board that is pivotally supported at one end of a case of the keyboard instrument to be closed and opened; and a second top board that is arranged close to the first top board above the case of the keyboard instrument, wherein the second top board is movable so as to enlarge a gap between the first top board and the second top board, wherein the first top board is allowed to be opened only when the Second top board is moved to enlarge the gap, and wherein the gap is automatically enlarged when the first top board is closed.

5. A top board structure adapted to a keyboard insttrument, comprising:

a first top board that is pivotally supported at one end of a case of the keyboard instrument to be closed and opened;

a second top board that is arranged close to the first top board above the case of the keyboard instrument; and a buffer member that is arranged in a gap between the first top board and the second top board, wherein the buffer member is deformable so as to enlarge the gap.

6. A top board structure adapted to a keyboard instrument, comprising:

a first top board that is pivotally supported at one end of a case of the keyboard instrument to be closed and opened; and a second top board that is arranged close to the first top board above the case of the keyboard instrument, wherein at least the second top board has a region that is deformable so as to enlarge a gap between the first top board and the second top board.

7. A top board structure adapted to a keyboard instrument, comprising:

a first top board that is pivotally supported at one end of a case of the keyboard instrument to be closed and opened;

a second top board that is arranged close to the first top board above the case of the keyboard instrument;

a gap enlarging structure for enlarging a gap between the first top board and the second top board;

a support rod for supporting the first top board to be opened at a stand position; and an opening motion regulator for regulating a rotation of the first top board to be opened and for maintaining the support rod supporting the first top board to be opened at the stand position.

8. The top board structure adapted to a keyboard instrument according to claim 7, wherein the gap enlarging structure is constituted by sliders allowing the second top board to slide forwards and backwards to enlarge or reduce the gap.

9. The top board structure adapted to a keyboard instrument according to claim 7, wherein the gap enlarging structure is constituted by a buffer member that is deformable so as to enlarge the gap.

10. The top board structure adapted to a keyboard instrument according to claim 7, wherein the gap enlarging structure is realized by splitting a rear end portion from the other portion of the second top board, so that the rear end portion directing facing with the first top board with the gap is deformable or displaceable so as to enlarge the gap.

11. The top board structure adapted to a keyboard instrument according to claim 7, wherein the opening motion regulator is interlocked with the gap enlarging structure adapted to the second top board in such a way that the first top board is inhibited from being opened unless the gap enlarging structure does not enlarge the gap between the first top board and the second top board.

12. The top board structure adapted to a keyboard instrument according to claim 7, wherein the opening motion regulator is interlocked with the support rod in such a way that when the first top board is opened and is supported by the support rod, the support rod is maintained at the stand position by being engaged with a shaft of the opening motion regulator.

13. The top board structure according to any one of claims 1 to 12, wherein the keyboard instrument is a grand piano.

14. The top board structure of claim 1, wherein the gap enlarging structure is a region that is operable to cause displacement so as to enlarge a horizontal gap between the first top board and the second top board.

* * * * *